United States Patent
Hoshino et al.

(10) Patent No.: US 10,876,432 B2
(45) Date of Patent: Dec. 29, 2020

(54) COMBINED CYCLE POWER SYSTEM WITH AN AUXILIARY STEAM HEADER SUPPLIED BY A FLASHER AND A SURPLUS STEAM LEAK

(71) Applicant: KABUSHIKI KAISHA TOSHIBA, Minato-ku (JP)

(72) Inventors: Takahisa Hoshino, Kanagawa (JP); Masashi Kimura, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 155 days.

(21) Appl. No.: 16/122,496

(22) Filed: Sep. 5, 2018

(65) Prior Publication Data

US 2019/0003344 A1 Jan. 3, 2019

Related U.S. Application Data

(62) Division of application No. 15/241,973, filed on Aug. 19, 2016, now abandoned.

(30) Foreign Application Priority Data

Aug. 19, 2015 (JP) .................................. 2015-162082

(51) Int. Cl.
- *F01K 23/10* (2006.01)
- *F02C 6/18* (2006.01)
- *F01K 7/16* (2006.01)

(52) U.S. Cl.
CPC .............. *F01K 23/101* (2013.01); *F01K 7/16* (2013.01); *F02C 6/18* (2013.01); *F05D 2220/32* (2013.01); *F05D 2220/72* (2013.01); *F05D 2220/76* (2013.01); *F05D 2260/213* (2013.01); *Y02E 20/16* (2013.01)

(58) Field of Classification Search
CPC ...... F01K 17/025; F01K 23/10; F01K 23/101; F02C 6/18; Y02E 20/16; F05D 2220/32; F05D 2220/72; F01D 11/04
See application file for complete search history.

(56) References Cited

U.S. PATENT DOCUMENTS

| | | | |
|---|---|---|---|
| 4,517,804 A * | 5/1985 | Ura | ......................... F01D 11/06 277/432 |
| 6,983,585 B2 | 1/2006 | Hattori | |
| 8,424,281 B2 * | 4/2013 | Sanchez | .................. F01D 25/12 122/7 R |

(Continued)

FOREIGN PATENT DOCUMENTS

| | | |
|---|---|---|
| JP | 7-83006 A | 3/1995 |
| JP | 9-32512 A | 2/1997 |

(Continued)

*Primary Examiner* — Jason H Duger
*Assistant Examiner* — Todd N Jordan
(74) *Attorney, Agent, or Firm* — Oblon, McClelland, Maier & Neustadt, L.L.P.

(57) ABSTRACT

A combined cycle power system includes a gas turbine exhausting an exhaust gas, a heat recovery steam generator including, a first economizer, a first steam generator, a second economizer, a second steam generator, a steam turbine which is driven by the steam generated at the first steam generator and the second steam generator, and a flasher which generates a first flash steam and a first drain water by flashing a portion of the water heated by the first economizer.

8 Claims, 6 Drawing Sheets

(56) References Cited

U.S. PATENT DOCUMENTS

| | | | |
|---|---|---|---|
| 8,539,750 B2 | 9/2013 | Bellows | |
| 2015/0000249 A1* | 1/2015 | Carroni | F01K 23/06 |
| | | | 60/39.182 |
| 2015/0113939 A1* | 4/2015 | Berg | F01K 17/025 |
| | | | 60/39.182 |

FOREIGN PATENT DOCUMENTS

| | | |
|---|---|---|
| JP | 9-125912 A | 5/1997 |
| JP | 2000-110511 | 4/2000 |
| JP | 2006-57929 A | 3/2006 |
| JP | 2007-255349 A | 10/2007 |
| KR | 10-0287463 B1 | 4/2001 |
| KR | 10-2004-0100680 A | 12/2004 |
| KR | 10-2015-0050443 A | 5/2015 |
| WO | WO 2011/080576 A2 | 7/2011 |
| WO | WO-2011080576 A2 * | 7/2011 ............ F22B 1/1815 |
| WO | WO 2014/006677 A1 | 1/2014 |

\* cited by examiner

COMBINED CYCLE POWER SYSTEM WITH AN AUXILIARY STEAM HEADER SUPPLIED BY A FLASHER AND A SURPLUS STEAM LEAK

CROSS-REFERENCE TO RELATED APPLICATION

This application is a divisional of U.S. application Ser. No. 15/241,973, filed Aug. 19, 2016, which is based upon and claims the benefit of priority from Japanese Patent Application No. 2015-162082, filed on Aug. 19, 2015, the entire contents of each of the above-identified applications are incorporated herein by reference.

FIELD

The present application is directed to a combined cycle power system that generates electricity by a gas turbine and a steam turbine.

BACKGROUND

A combined cycle power system generates electricity by a gas turbine and a steam turbine. The combined cycle power system has a heat recovery steam generator (HRSG) that generates steam by using waste heat of the exhaust gas from the gas turbine. The heat recovery steam generator (HRSG) is classified as a single-pressure type HRSG which comprises one set of an economizer, a steam drum, a steam generator, and a heater, and a multi-pressure type HRSG which comprises more than two sets of an economizer, a steam drum, a steam generator, and a heater.

As Japanese Patent Laid-open Publication No. 2000-110511 discloses, generally, in the case of small gas turbine, a single-pressure type HRSG could recover waste heat efficiently. However, in the case of large gas turbine, it is difficult to recover waste heat efficiently. Therefore, at a combined cycle power system including a large gas turbine such as more than 20 MW, the multi-pressure type HRSG is provided in order to recover waste heat more efficiently.

Recently, according to progress of a low NOx burning technology and a gas denitration technology, the temperature at an exit portion of the multi-pressure type HRSG is reduced. As a result, it is needed to recover waste heat at a low temperature portion of the HRSG efficiently.

Here, at the HRSG, the upstream of the exhaust gas is the high temperature portion, and the downstream of the exhaust gas is the low temperature portion. Heat is recovered as exhaust gas flows from upstream to downstream.

SUMMARY

Accordingly, the present embodiments provide a combined cycle power system that generates electricity by a gas turbine and a steam turbine.

In accordance with one presently disclosed aspect, a combined cycle power system includes a gas turbine driven by gas and exhausting an exhaust gas, a heat recovery steam generator including a first economizer which heats water by waste heat of the exhaust gas from the gas turbine, a first steam generator which generates steam from the water heated at the first economizer, a second economizer which heats water by waste heat of the exhaust gas prior to being supplied to the first economizer, a second steam generator which generates steam from the water heated at the second economizer, a steam turbine which is driven by the steam generated at the first steam generator and the second steam generator, and a flasher which generates a first flash steam and a first drain water by flashing a portion of the water heated by the first economizer.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of the specification, illustrate an embodiment of the embodiments and together with the description, serve to explain the principles of the embodiments.

DESCRIPTION OF THE EMBODIMENTS

Figure 1:
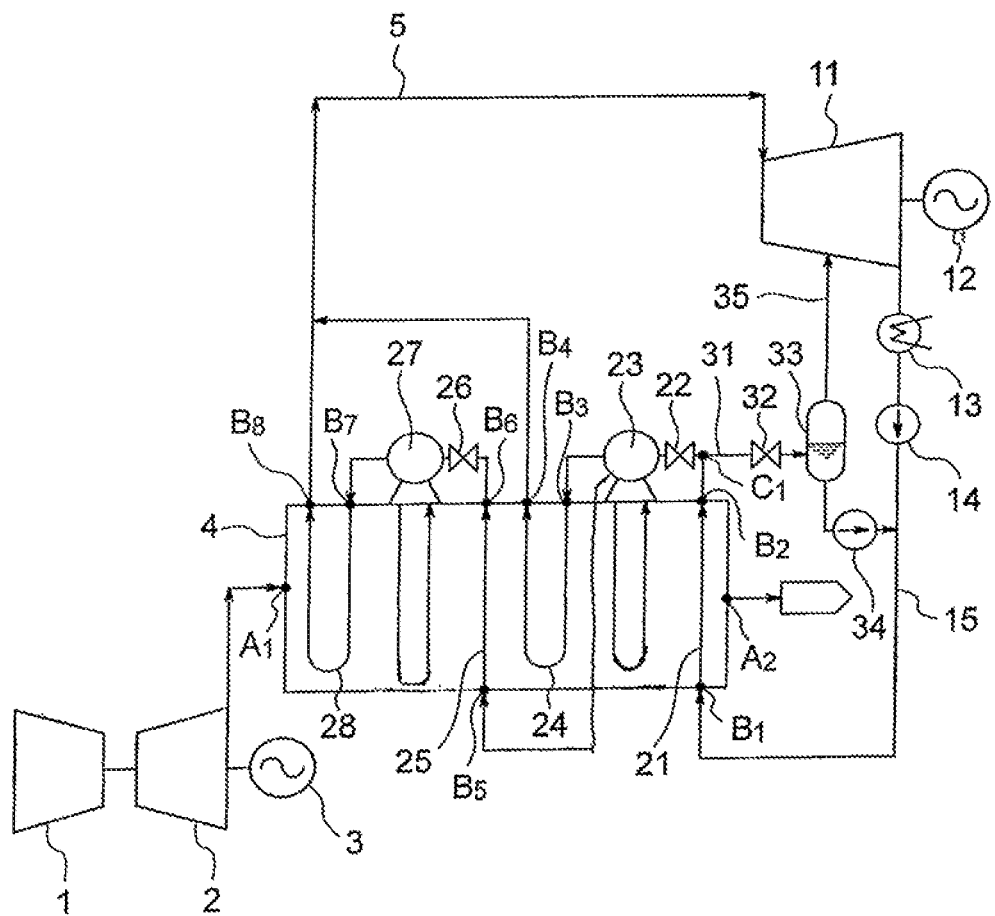
FIG. 1 is a drawing illustrating a combined cycle power system of a first embodiment.

Reference will now be made in detail to the present embodiment, an example of which is illustrated in the accompanying drawings. Wherever possible, the same reference numbers will be used throughout the drawing to refer to the same or like parts.

FIG. 1 is the drawing illustrating a combined cycle power system according to the first embodiment.

A combined cycle power system includes a compressor 1, a gas turbine 2, a first generator 3, a heat recovery steam generator (HRSG) 4, a main steam line 5, a steam turbine 11, a second generator 12, a condenser 13, a condenser water pump 14, a supply water line 15. The supply water line 15 is one example of a first flow line which supplies water from the condenser 13 to the HRSG 4.

The HRSG 4 is a multi-pressure type heat recovery steam generator, and includes a first economizer 21, a first valve 22, a first steam generator 23, a first heater 24, a second economizer 25, a second valve 26, a second steam generator 27, and a second heater 28.

The combined cycle generator system further includes a flasher supply water line 31, a flasher supply water valve 32, a first flasher 33, a drain pump 34, and a first flash steam line 35. The flasher supply water line 31 is one example of a second flow line which supplies water from the HRSG 4 to the first flasher 33.

Gas pressured by compressor 1 is supplied to the gas turbine 2. The gas could be air. The gas turbine 2 is driven by this gas and rotates. The first generator 3 generates electricity by rotation of the gas turbine 2. Exhaust gas from the gas turbine 2 is supplied to the HRSG 4. The HRSG 4 recovers waste heat of the exhaust gas by heating water, and generates steam from water. The steam generated at the HRSG 4 is supplied to the steam turbine 11 via the main steam line 5.

The steam turbine 11 is driven by the steam from the HRSG 4. The second generator 12 generates electricity by rotation of the steam turbine 11. The exhaust steam from the steam turbine 11 is supplied to the condenser 13. The condenser 13 cools the steam from the steam turbine 11 to produce condenser water. The condenser water pump 13 raises the pressure of the condenser water, and supplies the condenser water as a supply water to the HRSG 4 via the supply water line 15. The HRSG 4 recovers waste heat by using this supply water.

FIG. 1 shows an entrance A1 and an exit A2 of exhaust gas in HRSG 4, an entrance B1 and an exit B2 of water at the first economizer 21, an entrance B3 and an exit B4 of steam at the first heater 24, an entrance B5 and an exit B6 of water at the second economizer 25, and an entrance B7 and an exit B8 of steam at the second heater 28.

At the HRSG 4, the exhaust gas flows from the entrance A1 to the exit A2. In this process, waste heat of exhaust gas is recovered by the HRSG 4, in the order of the second heater 28, the second steam generator 27, the second economizer 25, the first heater 24, the first steam generator 23, and the first economizer 21.

The first economizer takes in water from the entrance B1, and heats water using waste heat of the exhaust gas, and discharges heated water from the exit B2. The first valve 22 is provided between the first economizer 21 and the first steam generator 23, and controls the supply of water from the first economizer 21 to the first steam generator 23.

The first steam generator 23 includes a steam drum (not shown) near the outside wall of the HRSG 4 and a steam vaporizing unit (not shown) inside of the HRSG 4. The water discharged from the first economizer 21 is introduced into the vaporizing unit via the steam drum, and water is heated in the vaporizing unit. By this process, a saturated steam is generated from the water. The first heater 24 takes in the saturated steam, heats the saturated steam using waste heat of the exhaust gas, and discharges heated steam to the exit B4. A portion of the water fed into the vaporizing unit is supplied to the second economizer 25.

The second economizer takes in water from the entrance B5, heats the water using waste heat of the exhaust gas prior to being supplied to the first economizer 21, and discharges heated water from the exit B6. The second valve 26 is provided between the second economizer 25 and the second steam generator 27, and controls the supply of water from the second economizer 25 to the second steam generator 27.

The second steam generator 27 also includes a steam drum (not shown) near the outside wall of the HRSG 4 and a steam vaporizing unit (not shown) inside of the HRSG 4. The water discharged from the second economizer 25 is introduced into the vaporizing unit via the steam drum, and is heated in the vaporizing unit. By this process, a saturated steam is generated from the water. The second heater 28 takes in the saturated steam from the entrance B7, heats using heat of the exhaust gas, and discharges heated steam to the exit B8.

The steam discharged from the exits B4 and B8 is supplied to the steam turbine 11 via the main steam line 5.

The HRSG 4 may include more than two sets of the economizer/valve/steam generator/heater. For example, the HRSG may include a third economizer, a third valve, a third steam generator, and a third heater.

In this case, the third economizer takes in water from the vaporizing portion of the second steam generator 23, and heats the water using heat of the exhaust gas prior to the gas being supplied to the first economizer 21 and second economizer 25. The third valve controls the water supply to the third steam generator from the third economizer. The third steam generator generates a saturated steam from water heated by the third economizer. The third heater heats the saturated steam and discharges the steam to the main steam line 5.

The flasher supply water line 31 is divided at the flow point C1 which is between the first economizer 21 and the first steam generator 23. Thus, the flasher supply water line 31 could supply a portion of the water heated by the first economizer 21 to the first flasher 33. The flasher supply water valve 32 is provided at the flasher supply water line 31, and controls supplying water from the first economizer 21 to the first flasher 33.

The first flasher 33 flashes (decompression boils) the water supplied from the flasher supply water line 31 at a defined pressure. In the result, a first flash steam and a first drain water is generated.

The drain pump 34 supplies the first drain water discharged from the first flasher 33 to the supply water line 15. By this process, the water flowing in the supply water line 15 is heated by the first drain water, and it is easy to generate steam at the HRSG 4.

The first flash steam line 35 supplies the first flash steam discharged from the first flasher 33 to the steam turbine 11. In this embodiment, the first flash steam is supplied to the middle row of the steam turbine 11. By this process, power of the steam turbine 11 is increased, and efficiency of the combined cycle power system is improved.

Generally, water is boiled at 100 degrees Celsius at 1 atm, and water is boiled at more than 100 degrees Celsius at over 1 atm. Furthermore, water which is not boiled at high temperature and high pressure condition is flashed when the water is introduced in low pressure condition. Therefore, the water heated by the first economizer 21 is supplied to the interior of the first flasher 33 whose pressure is lower than the saturating pressure of the water heated at the first economizer 21. For example, the first flasher 33 flashes the water at about 110~140 degrees Celsius at about 1.5~4.0 atm.

In this embodiment, the HRSG 4 is the multi-pressure type. The temperature of the exhaust gas at a portion of the exit B2 may be lower than the single-pressure type HRSG, and it is difficult to recover waste heat of the low temperature portion. For example, the water discharged from the first economizer 21 could be about 140 degrees Celsius.

In this embodiment, a portion of the water heated by the first economizer 21 is flashed by the first flasher 33. By this process, the water which is not boiled is flashed, and the first flash steam is generated. This first flash steam is supplied to the steam turbine 11 without further being heated at HRSG 4. In the result, heat of the water heated by the first economizer 21 is used efficiently at the steam turbine 11 by flashing at the first flasher 33.

As a result, by recovering heat of at the low temperature portion of the HRSG 4 (economizer 21), the combined cycle power system is driven efficiently.

Figure 2:
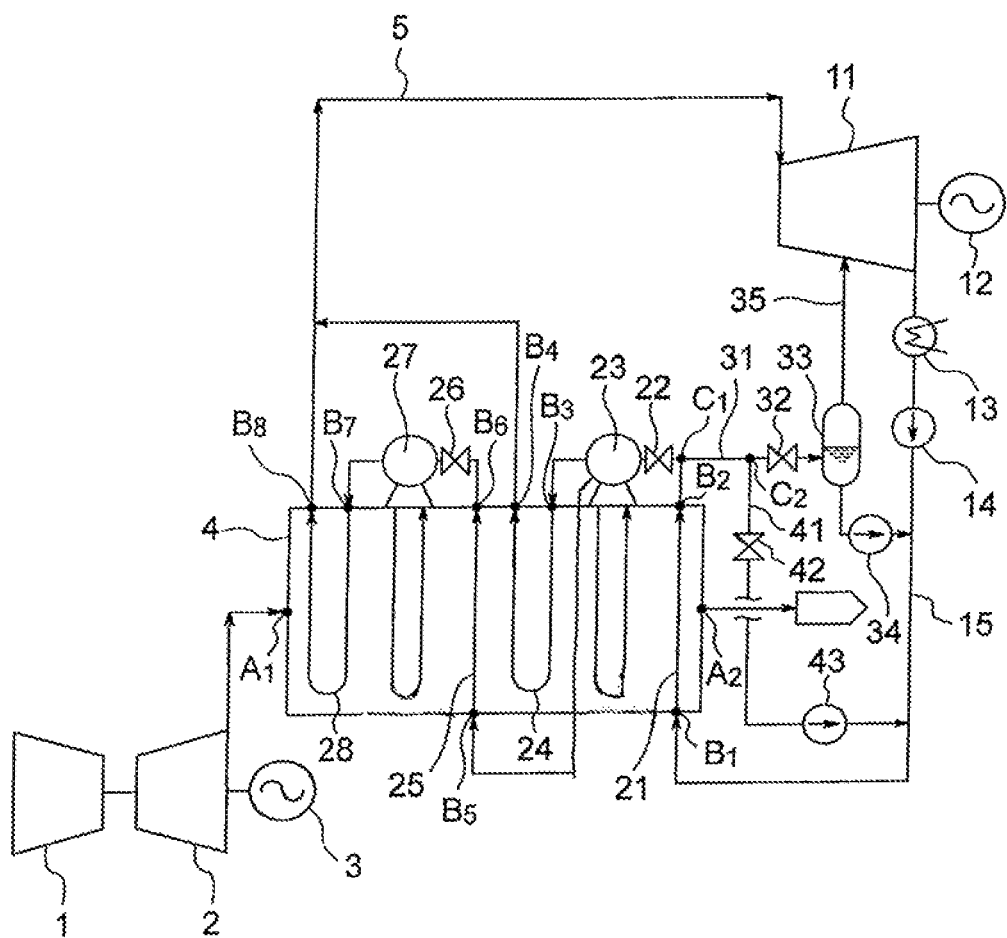
FIG. 2 is a drawing illustrating a combined cycle power system of a second embodiment.

FIG. 2 shows a combined cycle power system according to the second embodiment. The combined cycle power system further includes a recirculation line 41, a recirculation valve 42, and a recirculation pump 43. The recirculation line 41 is one example of a third flow line which supplies water from the flasher supply water line 31 to the supply water line 15.

The recirculation line 41 is divided at a point C2 from the flasher supply water line 31, ad reaches the supply water line 15. Thus, the recirculation line 41 can supply a portion of the water flowing in the flasher supply water line 31 to the supply water line 15 not via the first flasher 33.

The recirculation valve 42 is provided at the recirculation line 41, and controls supplying water via the recirculation line 41. The recirculation pump 43 takes in a portion of the water flowing at the flasher supply water line 31 to the recirculation line 41, and supplies the water to the supply water line 15 via the recirculation line 41.

In this embodiment, the first drain water from the first flasher 33 and the water from the recirculation line 41 are both supplied to the supply water line 15. Thus, water flowing at the supply water line 15 is further heated compared to the first embodiment, and steam is easily generated at the HRSG 4.

Supplying heated water using the recirculation line 41 has a further advantage. When the first economizer 21 takes in low temperature water, water and sulfur in the exhaust gas condenses in the first economizer 21. This condensed water and sulfur may cause rust in the first economizer 21. Such condensing of water and sulfur is suspended by heating. In this embodiment, by supplying heated water using recirculation line 41, condensing of water and sulfur in the exhaust is avoided more efficiently.

The recirculation valve 42 controls supplying water as the temperature of the water supplied to the entrance B1 of the first economizer 21 is above defined temperature. The supply water temperature could be controlled by opening of the recirculation valve 42. Because vapor in the exhaust gas condenses at about 45 degrees Celsius, the supply water temperature at the exit B1 of the first economizer 21 is preferably controlled above 50 degrees Celsius.

Figure 3:
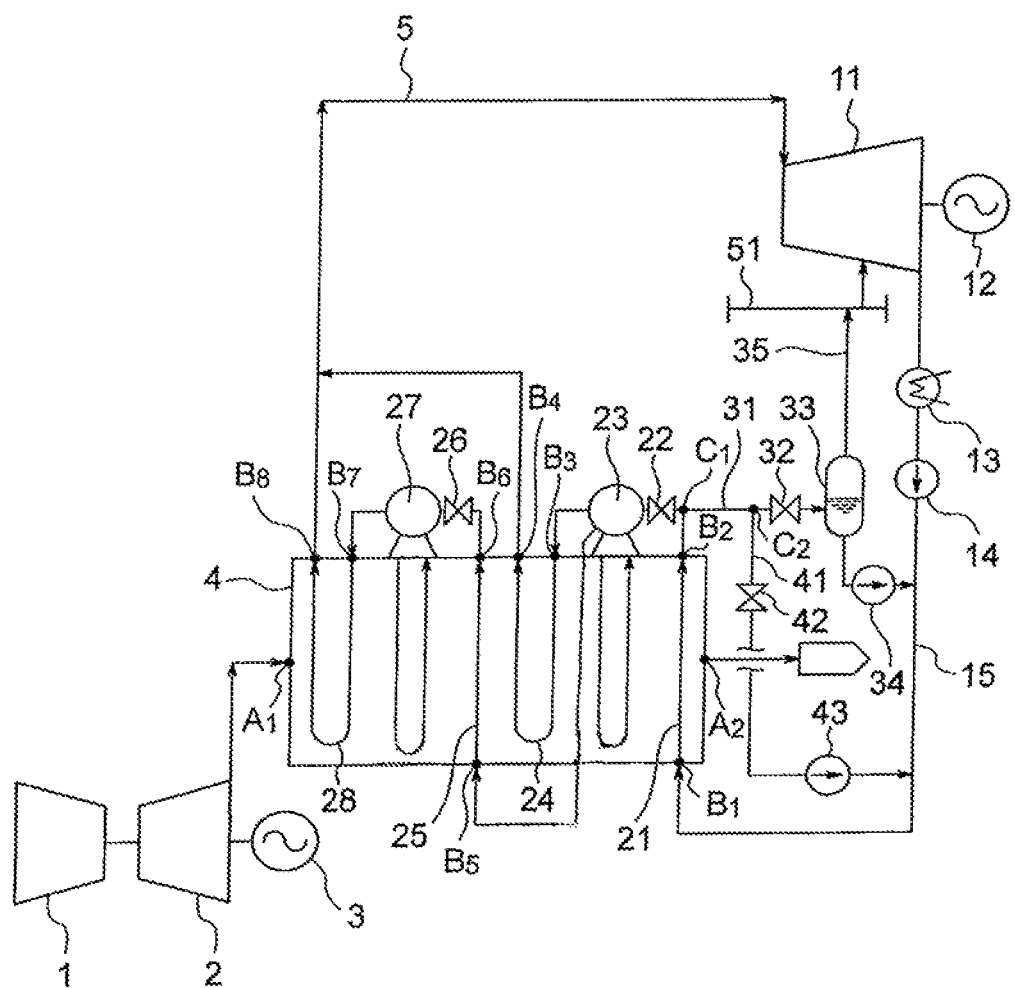
FIG. 3 is a drawing illustrating a combined cycle power system of a third embodiment.

FIG. 3 shows a combined cycle power system according to the third embodiment. The combined cycle power system further includes an auxiliary steam header 51.

The first flasher 33 supplies the first flash steam to the auxiliary steam header 51 via the first flash steam line 35. The auxiliary steam header 51 supplies an auxiliary steam to the steam turbine 11. The auxiliary steam is supplied to the main steam turbine, and is used for supporting amount of the main steam. For example, when the main steam is short, the auxiliary steam is supplied. The auxiliary steam header 51 supplies the first flash steam as the auxiliary steam to the main steam turbine 11.

Figure 4:
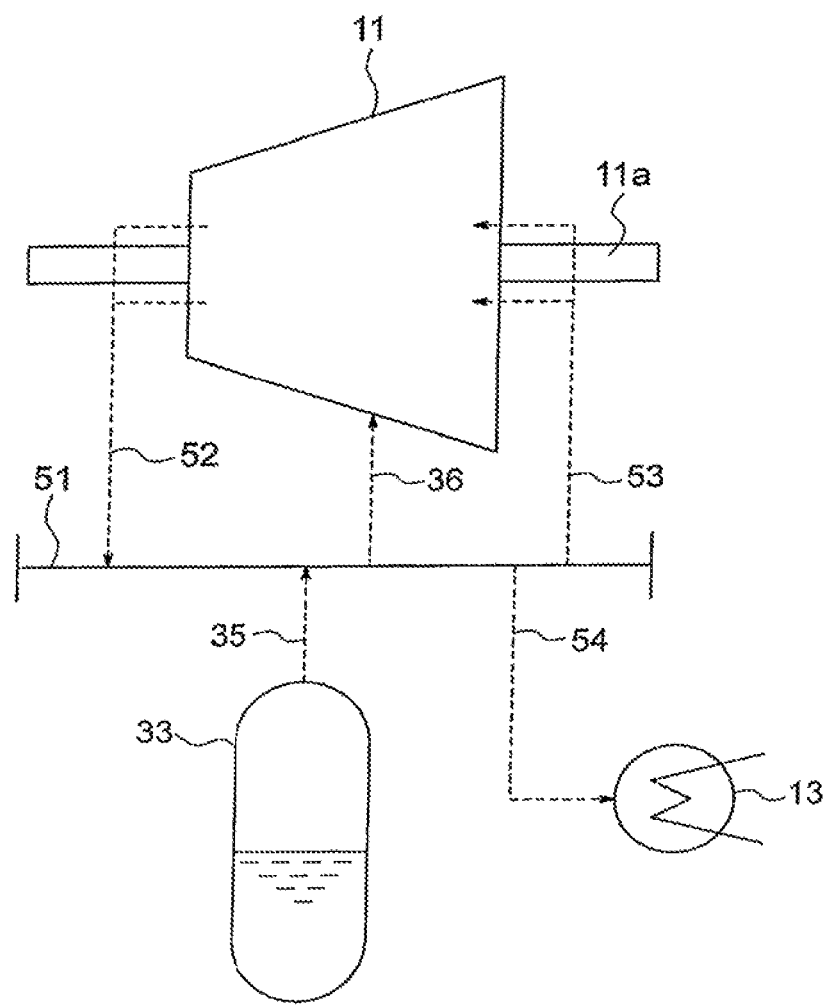
FIG. 4 shows components of an auxiliary steam header according to the third embodiment.

FIG. 4 shows components of auxiliary steam header 51 according to the third embodiment. At an upstream side of the steam turbine 11, a surplus steam 52 at the steam turbine 11 leaks from the interspace between the turbine rotor 11a and the turbine casing. The surplus steam 52 is supplied to the auxiliary steam header 51.

At the upstream side of the steam turbine 11, air outside of the steam turbine 11 is absorbed into the interspace the turbine rotor 11a and the turbine casing. However, it is not preferable that air is introduced into the interspace portion. Therefore, the auxiliary steam header 51 supplies the auxiliary steam 52 as a seal steam 53 to the interspace portion.

The first flash steam and the auxiliary steam 52 are supplied to the auxiliary steam header 51. The auxiliary steam header 51 mixes the first flash steam and the auxiliary steam 52, and supplies a mixed steam 36 to the middle row of the steam turbine 11. By this process, power of the steam turbine is increased, and efficiency of the combined cycle is improved.

This mixed steam is also used for the seal steam 53. The auxiliary steam header 51 supplies the mixed steam as the seal steam 53 to the interspace portion. The auxiliary steam header 51 could discharge a remaining mixed steam 54 to the condenser 13.

A conventional auxiliary steam header supplies surplus steam as a seal steam to the steam turbine. However, in this embodiment, the auxiliary steam header 51 supplies the mixed steam which is a mix of the first flash steam and the surplus steam 52 as the seal steam 53 to the steam turbine 11. As a result, shortage of the seal steam 53 could be avoided.

Figure 5:
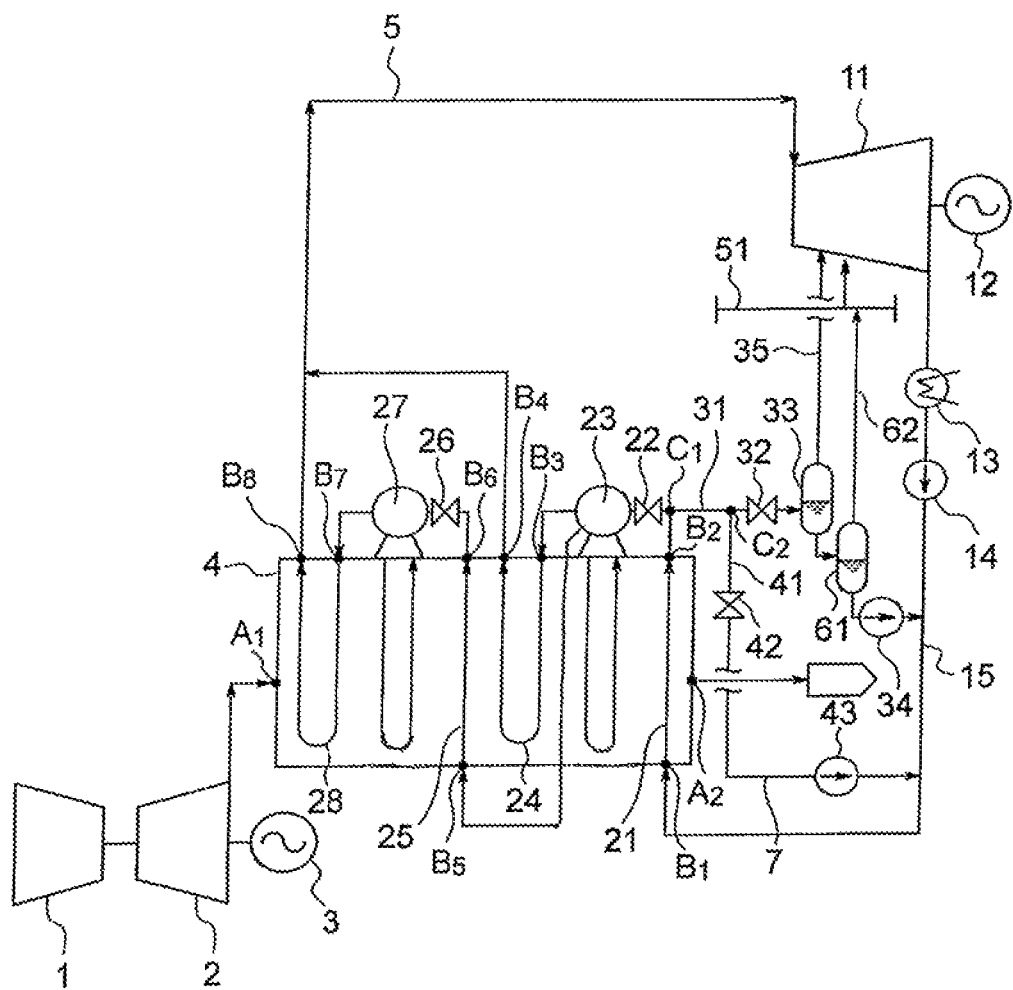
FIG. 5 is a drawing illustrating a combined cycle power system according to a fourth embodiment.
Figure 6:
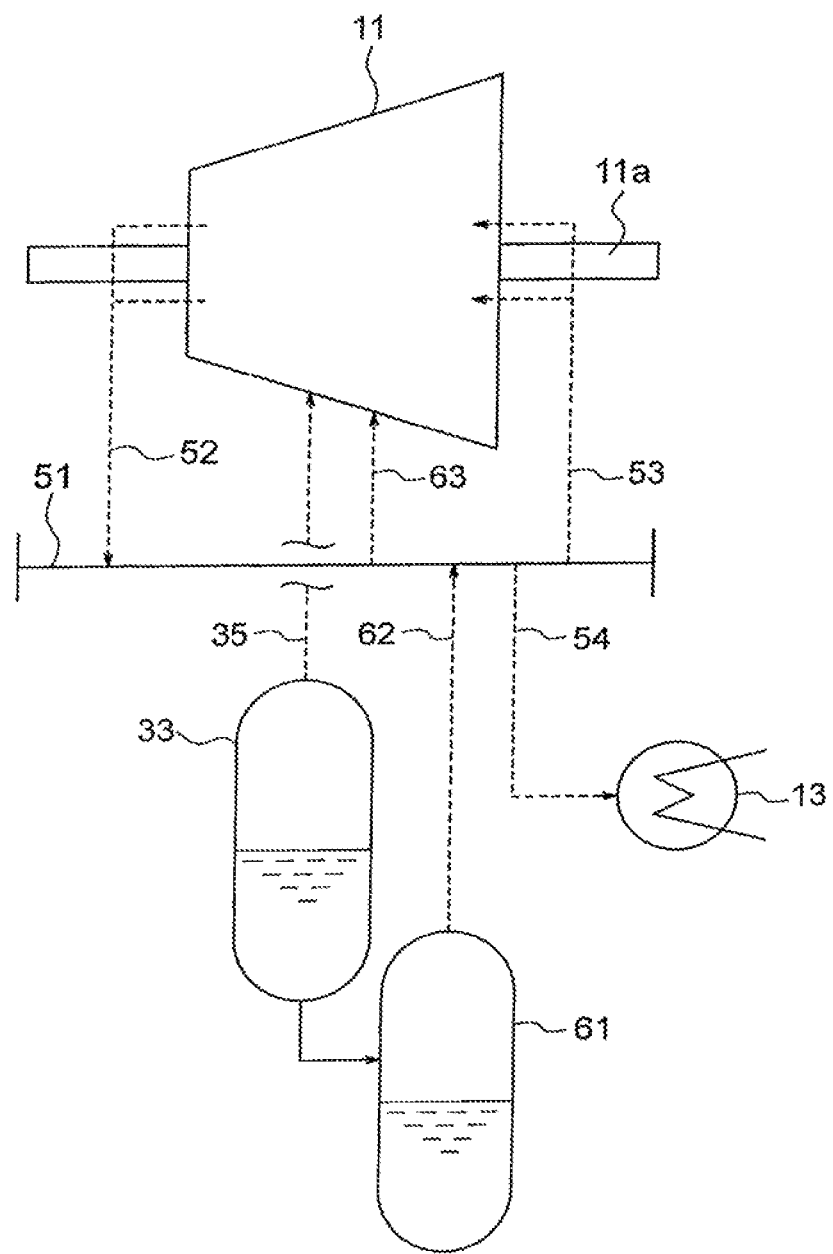
FIG. 6 shows components of a second flasher and a second flash line according to the fourth embodiment.

FIG. 5 shows a combined cycle power system according to the fourth embodiment. The combined cycle power system further includes a second flasher 61 and a second flash line 62. FIG. 6 shows components of the second flasher 61 and the second flash line 62 according to the fourth embodiment.

In this embodiment, the first flasher 33 supplies the first steam to the middle row of the steam turbine 11 via the first flash steam line 35. And the first flasher 33 supplies the first drain water to the second flasher 61.

The second flasher 61 flashes the first drain water at a defined pressure, and a second flash steam and a second drain water are generated from the first drain water.

The drain pump 34 supplies the second drain water discharged from the second flasher 61 to the supply water line 15. By this process, water flowing in the supply water line 15 is heated by the second drain water, and steam is easily generated at the HRSG 4.

The second flash steam line 62 supplies the second flash steam discharged from the second flasher 61 to the auxiliary steam header 51. In this embodiment, the auxiliary header 51 supplies the second flash steam as the auxiliary steam to the steam turbine 11. In this embodiment, the second flasher 61 can supply the second flash steam to the steam turbine 11 via the auxiliary steam header 51.

As shown in FIG. 6, The second flash steam and the surplus steam 52 are supplied to the auxiliary steam header 51. The auxiliary steam header 51 mixes the second flash steam and the surplus steam 52, and supplies a mixed steam 63 to the middle row of the steam turbine 11. By this process, the efficiency of the combined cycle power system is improved. Here, the middle row of the steam turbine 11 to which the mixed steam 63 is supplied is located at downstream of the row of the steam turbine 11 to which the first flash steam is supplied.

This mixed steam is also used for the seal steam 53. The auxiliary steam header 51 supplies the mixed steam as the seal steam 52 to the interspace portion between the turbine rotor 11a and the turbine casing. Thus, in this embodiment, it is possible to suspend shortage of the seal steam 53 compared to supplying the surplus steam only. The auxiliary steam header 51 could discharge excess of the mixed steam as steam 54 to the condenser 13.

In this embodiment, the second flasher 61 flashes the first drain water, and steam generated from the first drain water is used for improving the efficiency of the combined cycle power system.

The first flash steam has higher pressure than the second flash steam. In this embodiment, the first flash steam is used for driving the steam turbine 11 mainly, and the second flash steam is used for driving the steam turbine 11 and for the seal steam.

A more complete appreciation of the invention and many of the attendant advantages thereof will be readily obtained as the same becomes better understood by reference to the following detailed description when considered in connection with the accompanying drawings, wherein.

What is claimed is:

1. A combined cycle power system, comprising:
   a gas turbine driven by a gas, and exhausting an exhaust gas,
   a heat recovery steam generator including:

a first economizer which heats water using waste heat of the exhaust gas from the gas turbine, a first steam generator which generates steam from the water heated by the first economizer, a second economizer which heats water, using waste heat of the exhaust gas, wherein the second economizer is upstream of the first economizer relative to a direction of flow of the exhaust gas, a second steam generator which generates steam from the water heated by the second economizer, a steam turbine which is driven by the steam generated at the first steam generator and the second steam generator, a first flasher which generates a first flash steam and a first drain water by flashing a portion of the water heated by the first economizer, and an auxiliary steam header which supplies an auxiliary steam to the steam turbine, wherein the steam turbine has a turbine rotor and a turbine casing, a surplus steam leaks from a first interspace portion between the turbine rotor and the turbine casing of an upstream side of the steam turbine, the first flasher supplies the first flash steam to the auxiliary steam header, the auxiliary steam header mixes the first flash steam with the surplus steam to form a mixed first flash steam and supplies a first portion of the mixed first flash steam to the steam turbine for driving the steam turbine, and supplies a second portion of the mixed first flash steam to a second interspace portion between the turbine rotor and the turbine casing of a side other than the upstream side of the steam turbine for sealing the second interspace portion.

2. The combined cycle power system of claim 1, further comprising:

a second flasher which flashes the first drain water, and generates a second flash steam and a second drain water.

3. The combined cycle power system of claim 2, wherein the second flasher supplies the second flash steam to the steam turbine.

4. The combined cycle power system of claim 2, further comprising:

a first flow line which supplies water to the first economizer, wherein the second flasher supplies the second drain water to the first flow line.

5. A method of operating a combined cycle power system, comprising:

heating water using waste heat of a gas turbine at a first economizer, generating steam from the water heated at the first economizer using a first steam generator, heating water using waste heat of exhaust gas of the gas turbine at a second economizer, wherein the second economizer is upstream of the first economizer relative to a direction of flow of the exhaust gas, generating steam from the water heated at the second economizer at a second steam generator, driving a steam turbine using the steam from the first steam generator and the second steam generator, generating a first flash steam and a first drain water by flashing a portion of the water heated by the first economizer using a first flasher, supplying the first flash steam to the steam turbine, and supplying, by an auxiliary steam header, an auxiliary steam to the steam turbine, wherein the steam turbine has a turbine rotor and a turbine casing, a surplus steam leaks from a first interspace portion between the turbine rotor and the turbine casing of an upstream side of the steam turbine, the generating the first flash steam and the first drain water includes supplying the first flash steam to the auxiliary steam header, the auxiliary steam header mixes the first flash steam with the surplus steam to form a mixed first flash steam and supplies a first portion of the mixed first flash steam to the steam turbine for driving the steam turbine, and supplies a second portion of the mixed first flash steam to a second interspace portion between the turbine rotor and the turbine casing of a side other than the upstream side of the steam turbine for sealing the second interspace portion.

6. The method of claim 5, further comprising:

flashing the first drain water using a second flasher to generate a second flash steam and a second drain water.

7. The method of claim 6, comprising:

supplying the second flash steam to the steam turbine.

8. The method of claim 6, comprising:

supplying the second drain water from the second flasher to the first economizer.

* * * * *